United States Patent Office 3,336,813
Patented Aug. 22, 1967

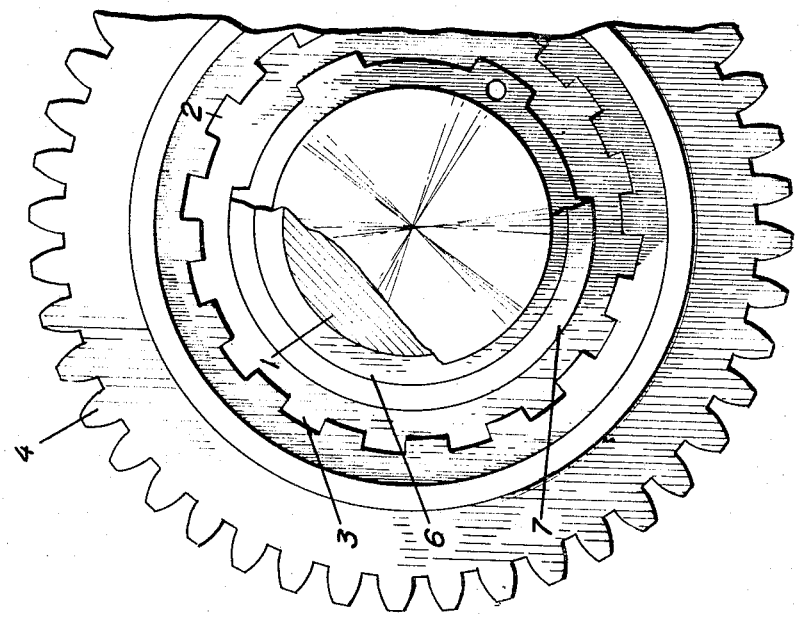
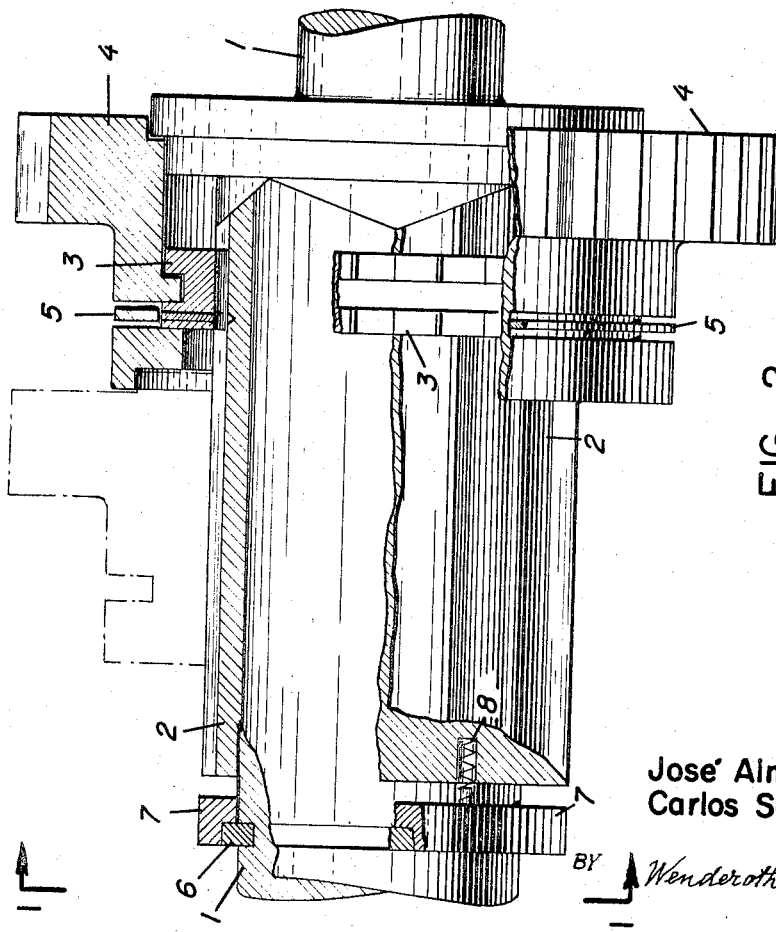

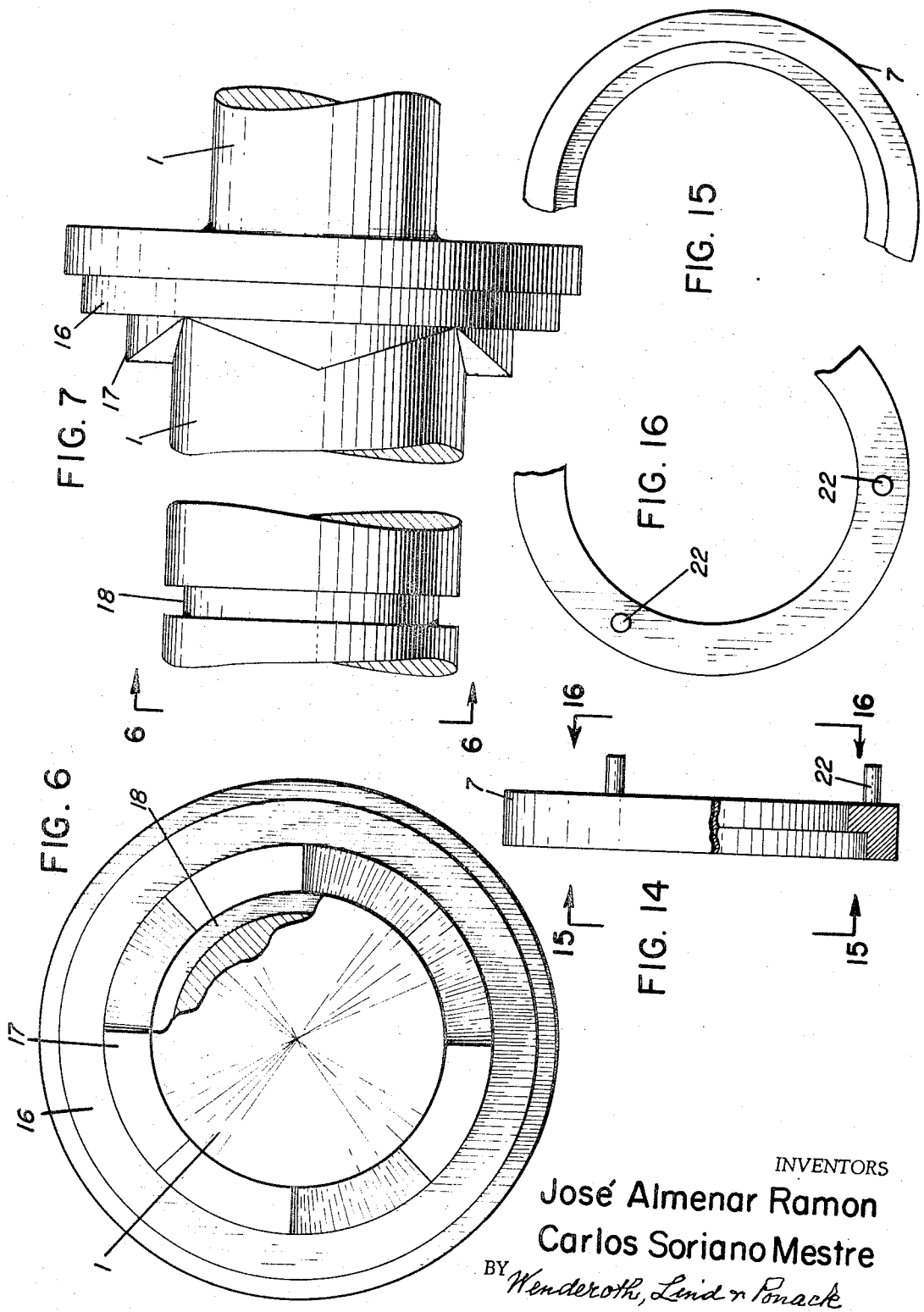

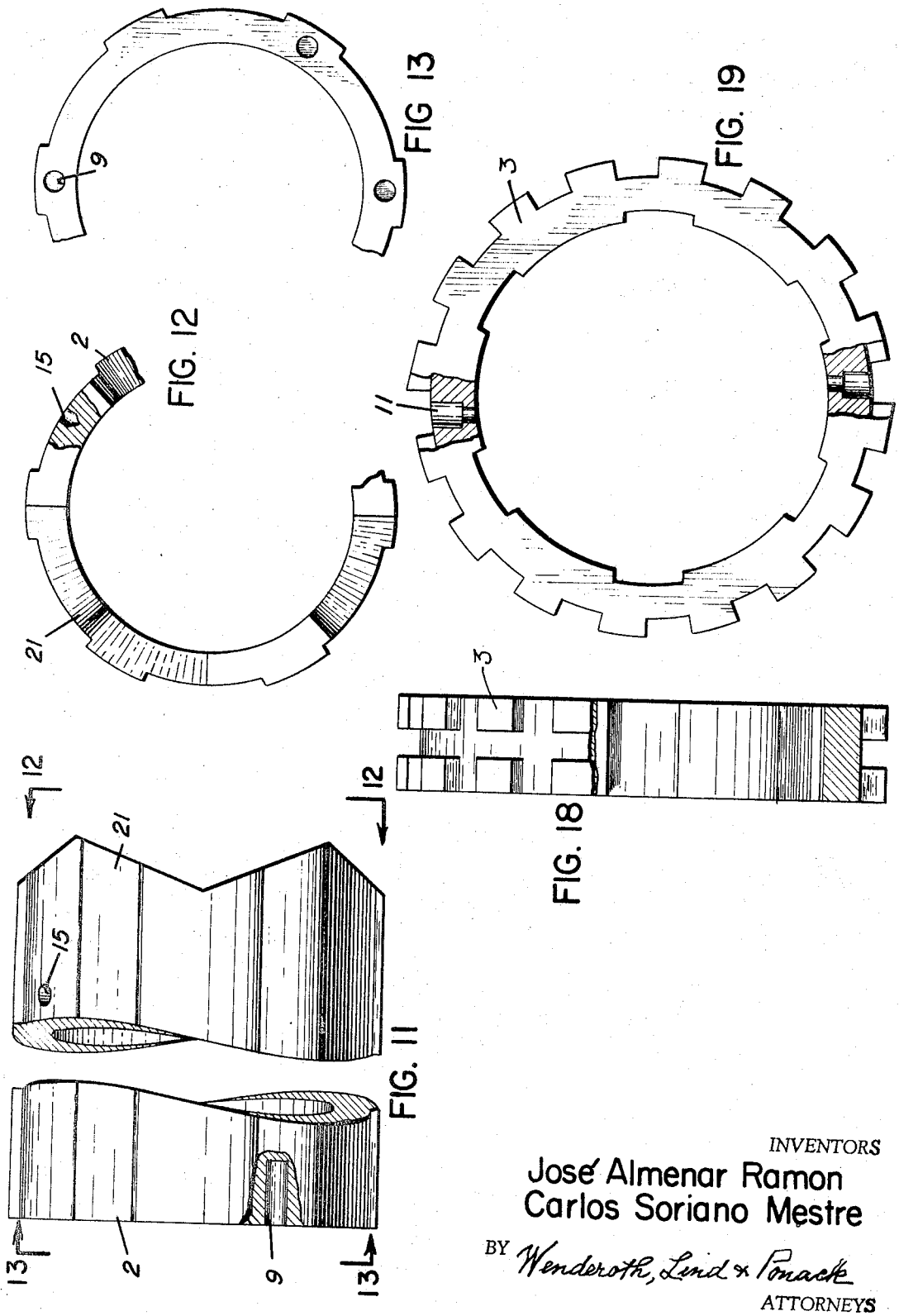

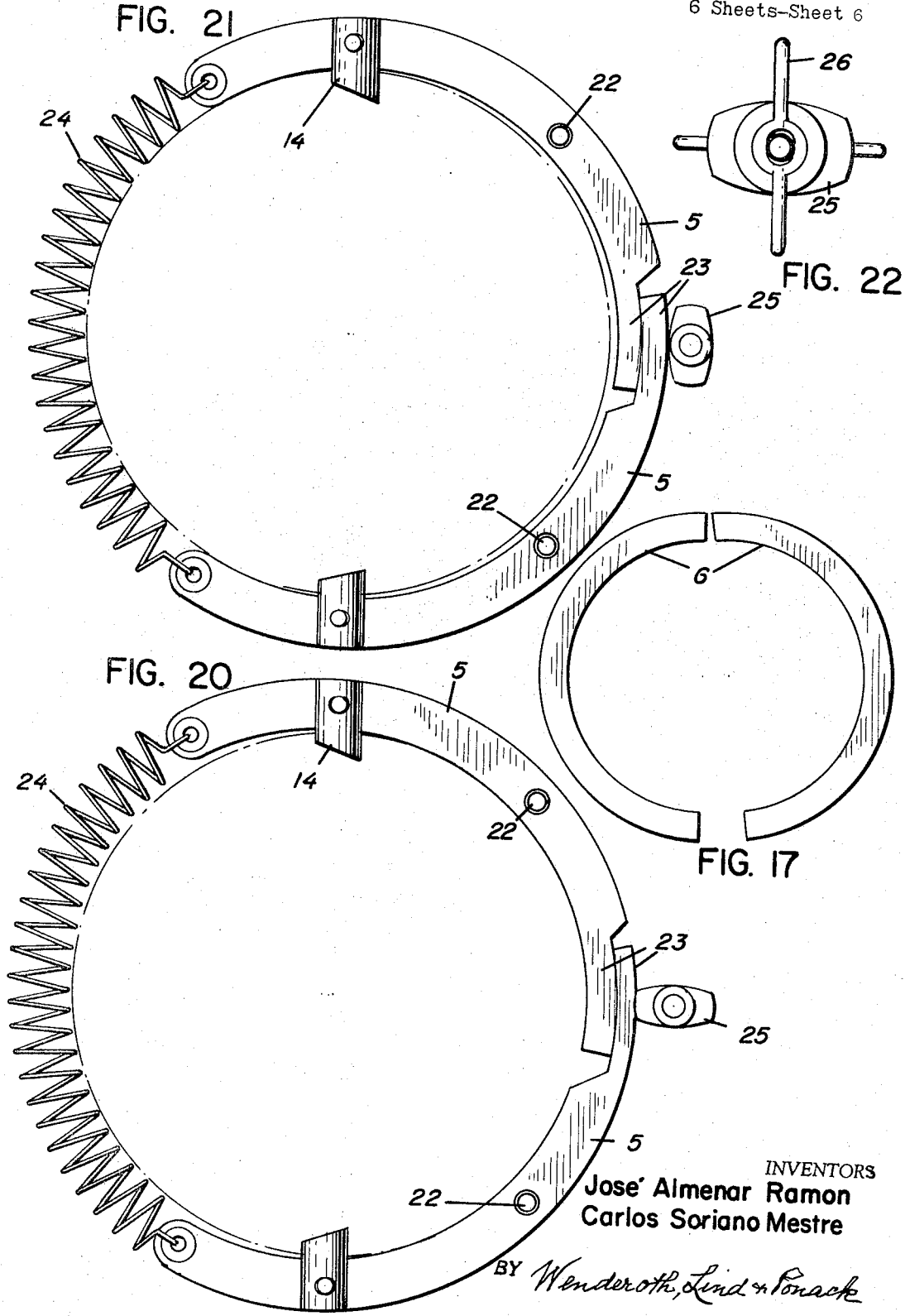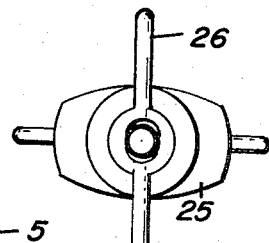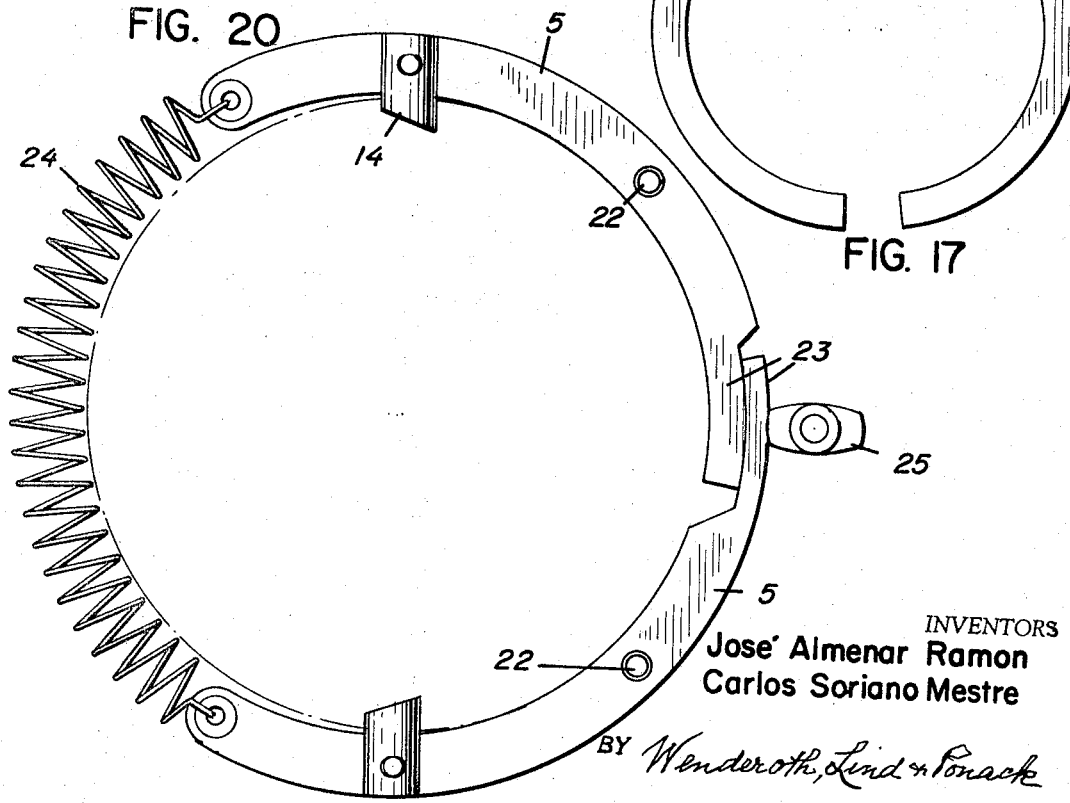

3,336,813
CHANGE SPEED GEAR
Jose Almenar Ramon and Carlos Soriano Mestre, both of Calle Pavia 41, Grao-Valencia, Spain
Filed Oct. 21, 1965, Ser. No. 499,648
Claims priority, application Spain, July 30, 1965, 316,002
6 Claims. (Cl. 74—337.5)

This invention relates to a change speed gear for cars.

An object of this invention is to provide a change speed gear for cars which effects gearings that bring about speed changes between the motor and the coupling without a dead point, without the necessity of synchronizing even approximately the various elements to make coupling possible, without any limitation of demultiplication or multiplication concerning the speeds and without maintaining a certain sequence of operation.

A further object is to effect all the steps of a speed change without any need of a clutch which is practically eliminated with the subsequent advantages concerning economy, improvement of load, suppression of damage and simpler and more economic maintenance, etc.

A further object is to eliminate double coupling for higher speeds and thereby prevent accidents which occur with typical gear-boxes in which the driver loses control and the car deviates and collides against some obstacle that cannot be eluded.

A still further object is to couple as many variations of speed as possible without limitation.

With the above and other objects in view which will become apparent from the detailed description below, a preferred non-limitative form of the invention is shown in the drawings in which:

FIG. 1 is a partial front view.

FIG. 2 is a side view with parts broken away and shown in cross-section.

FIG. 6 is a view on section line 6—6 of FIG. 7 looking in the direction of the arrows illustrating particularly the construction of the driving shaft.

FIG. 7 is a side view of the construction shown in FIG. 6.

FIG. 11 is a side view of the sleeve which is longitudinally slidable upon the axle 1.

FIG. 12 is a partial front view with parts broken away taken upon section line 12—12 of FIG. 11 looking in the direction of the arrows.

FIG. 13 is a partial rear view taken upon section line 13—13 of FIG. 11 looking in the direction of the arrows.

FIG. 14 is a side view with parts broken away of a collar coupled to the axle.

FIG. 15 is a partial rear view taken upon section line 15—15 of FIG. 14 looking in the direction of the arrows.

FIG. 16 is a partial front view of the collar taken upon section line 16—16 of FIG. 14 looking in the direction of the arrows.

FIG. 17 is a plan view of half rings which act as a pivot.

FIG. 18 is a side view with parts broken away showing a tooth collar.

FIG. 19 is a front view of the collar shown in FIG. 18 with parts broken away.

FIG. 20 is a side view of the control elements for the change speed gear.

FIG. 21 is a view similar to FIG. 20 showings the control elements in a different position, and FIG. 22 is a plan view illustrating the cam for actuating the control elements shown in FIGS. 20 and 21.

Figure 4:
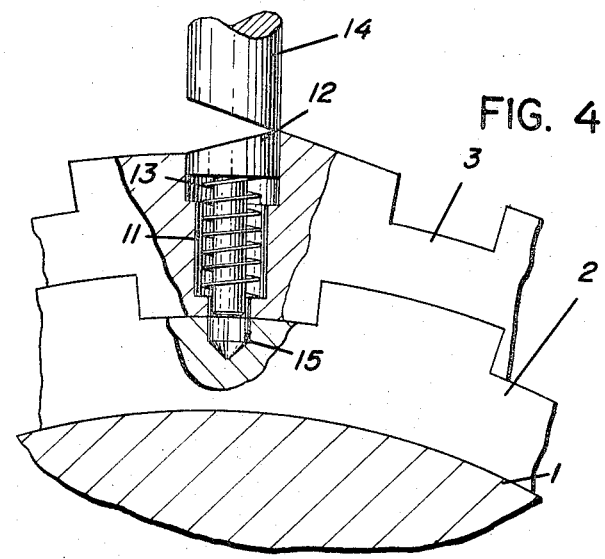
FIG. 4 is a partial side view with parts in elevation illustrating the means for locking the axle to the gear wheel in unlocked position.

Referring to the drawings the motor drive shaft is shown at 1. Upon the shaft 1 there is provided a sleeve 2 capable of sliding longitudinally thereon. A toothed collar 3 encircles the sleeve 2.

A gear 4 rotatably mounted on shaft 1 is provided with spaced rows of inner teeth which will drive the collar 3 when in mesh therewith and vice versa. The gear 4 is provided with a collar having a cylindrical groove 19 between said rows of teeth in which are supported the ring shaped levers 5.

Spaced from the gear 4 on the shaft 1 there is provided a cylindrical groove 18 in which there is located a set of two ring shaped half crowns or segments 6 embracing the shaft and such set is embraced in turn and held by the collar 7 at that pivot. Springs 8 are provided coacting with the sliding sleeve 2 and the springs 8 abut at their other end the collar 7. The collar 7 has at its interior the segments 6 more particularly shown in FIGURE 17.

In FIGURE 2 there is shown in dot-and-dash lines the position of another gear similar to gear 4 and there may be provided upon the sleeve 2 as many gears as may be required, one for each desired speed.

Figure 3:
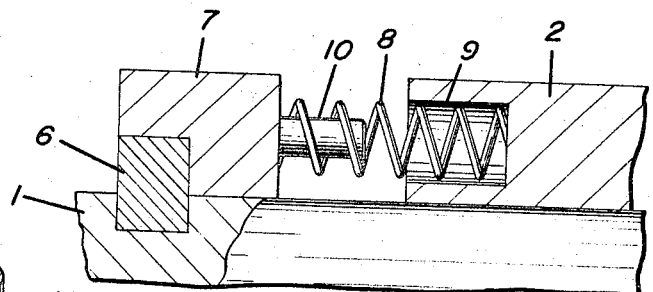
FIG. 3 is a partial side view of a detail.

FIGURE 3 shows the details of the springs 8 wherein one end is lodged in a cylindrical bore 9 provided at the inner face of the sleeve 2 and the other end of the springs 8 abut the collar 7 upon which pins 10 are provided to support the springs.

Figure 5:
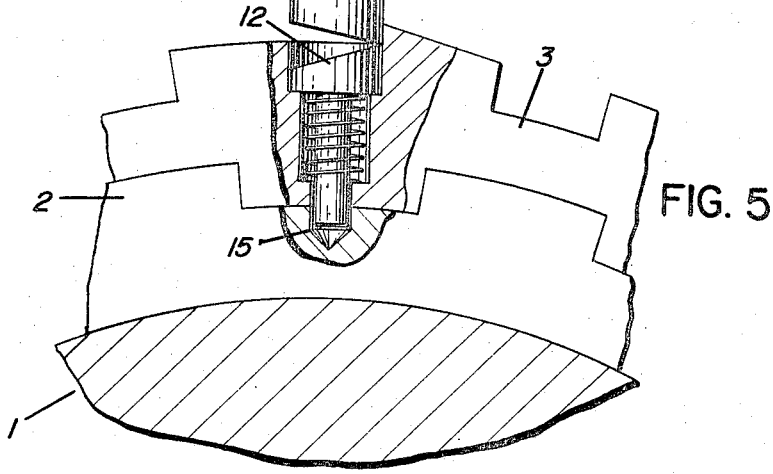
FIG. 5 is a view similar to FIG. 4 showing the parts in locked position.

In FIGURES 4 and 5 the means for locking the shaft 1 to the gear 4 are shown. The circular levers 5 illustrated in FIGURES 2, 20 and 21 are designed for control purposes.

The toothed collar 3 as shown in FIGURES 4 and 5 is provided with the bores 11 and the sleeve 2 is provided with the bores 15. The bores 11 are narrowed at their interior to correspond approximately to the diameter of the bores 15. A shoe or pin 12 is located in the bore 11 and is urged outwardly by a spring 13. However, when the pins 14 on the levers 5 are moved downwardly from the position shown in FIGURE 4 to that in FIGURE 5 the pin 12 is moved inwardly against the action of the spring 13 so that the lower end of said pin projects into the bore 15 and the collar 3 is thereby coupled to the sleeve 2.

When the pins 12 are in the position shown in FIGURE 4 then the shaft 1 and the sleeve 2 are free and can rotate. The operative position of the pin 12 is shown in FIGURE 5.

As shown in FIGURE 5 when the pin 12 is engaged the lower end thereof will be forced into the bore 15 of the sleeve 2 and the sleeve 2 is thereby joined to the collar 3 and since the sleeve 2 is connected in turn to the shaft 1 by its internal gear teeth the entire construction operates as an entity and will be driven rotatably by the shaft 1.

The construction of the driving shaft 1 is shown in FIGURES 6 and 7. Such shaft has a concentric graduation 16 which has at its inner face the cams 17 with sliding surfaces. Thus, when the sleeve 2 is locked by the pin or shoe 12 as in FIGURE 5 and is caused to slide longitudinally so that the exterior teeth of the collar 3 will mesh with the interior teeth of gear 4 thereby effecting the transmission as long as the shoe 12 remains in depressed position.

The cylindrical groove 18 receives the half segments 6 which are located within collar 7 provided with the pins 10 cooperating with the springs 8.

Figure 8:
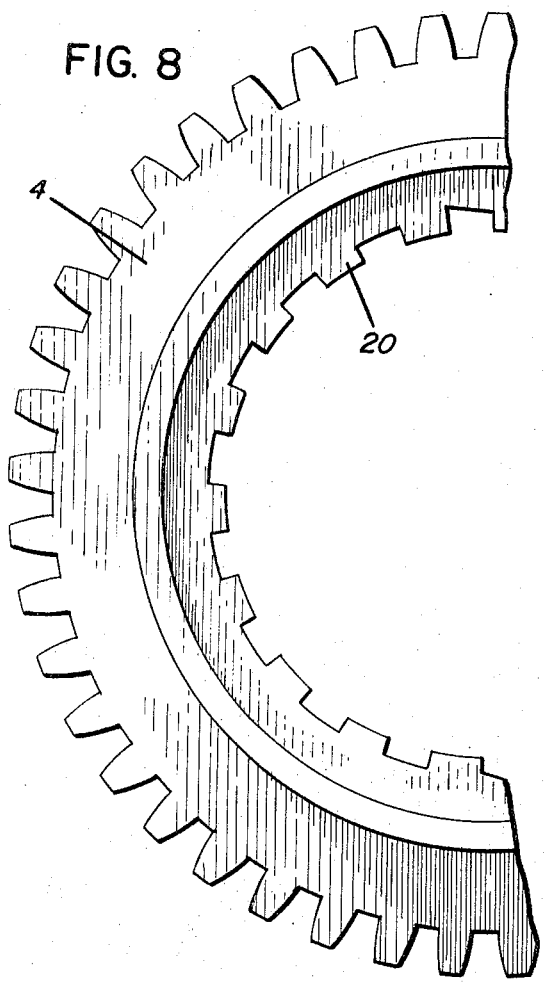
FIG. 8 is a partial side view taken upon section line 8—8 of FIG. 9 illustrating the construction of the gear wheel.
Figure 9:
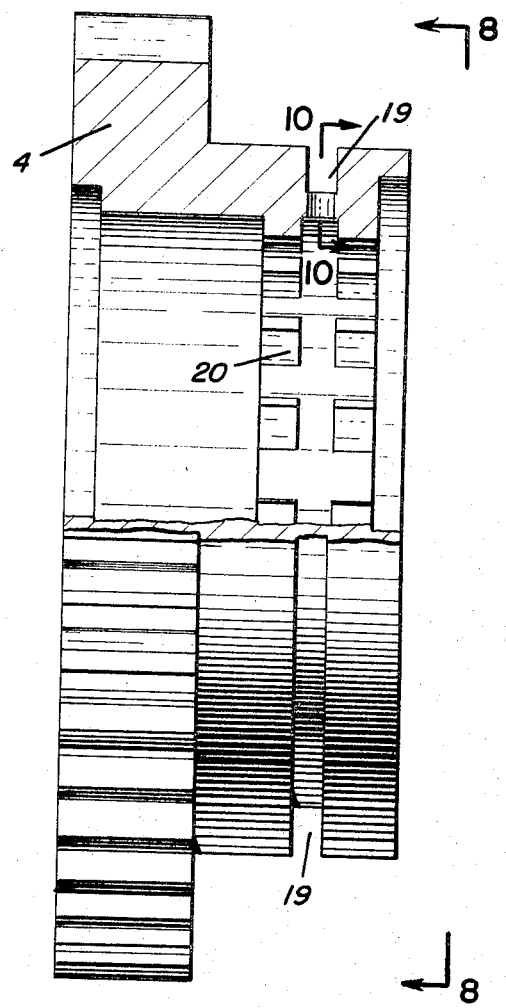
FIG. 9 is a side view of the gear wheel shown in FIG. 8 with parts broken away.
Figure 10:
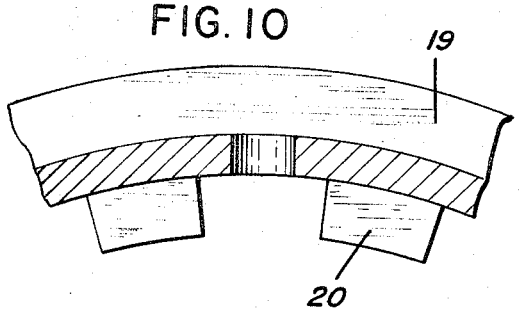
FIG. 10 is a cross-sectional view taken upon section line 10—10 of FIG. 9 looking in the direction of the arrows.

The construction of the gear 4 is shown in FIGURES 8, 9 and 10 and a cylindrical groove 19 is located in the collar thereof in which the levers or operating elements 5 are located. This collar on the gear 4 has at the interior as clearly shown in FIGURE 9 a double row of teeth 20 to which the collar 3 is coupled when moved and an exterior row of teeth on the gear 4 secures the transmission to the element being driven.

The construction of the sleeve 2 is illustrated in FIGURES 11, 12 and 13. The bore 9 as previously mentioned contains one end of the spring abutting the collar 7. As shown, the sleeve 2 has a system of cams 21 at one of its ends which when sliding on the cams 17 of the shaft 1 produces the longitudinal sliding of the sleeve 2 and the meshing of the transmission gearing. The bores 15 cooperate with the pin 12 and the bores 9 cooperate with the springs 8 whereby the sleeve 2 is moved to its original position when the shoes or pins 12 leave the bore 15 as shown in FIGURE 4 of the drawings.

The construction of the collar 7 is shown in FIGURES 14, 15 and 16. Its interior diameter is coupled to the shaft 1 because the half-segments 6 are lodged in the concentric groove 18. The collar 7 as indicated is provided with the supporting pins 10 for the springs 8.

In FIGURE 17 there is shown a plan view of the half rings 6 which act as a pivot.

The toothed collar 3 is shown in end and plan views in FIGURES 18 and 19. As shown, the outer surface has a double parallel row of teeth which are designed to mesh with the teeth at the interior of the gear 4 as mentioned above. At the interior of the collar 3 there is another set of teeth which cooperate with the teeth upon the sleeve 2. There are also provided the passages 11 for the pin or shoe 12 which cooperates with the coil spring 13 as shown in FIGURES 4 and 5.

The elements for controlling the change speed gear are shown in FIGURES 20, 21 and 22. These elements are operated by the cam 25 provided with wings as shown in FIGURE 22 for operating the same. As shown, the control elements are the levers 5 which pivot on the pins 22. The levers 5 are connected at their ends by the spring 24 which tends to draw them into the position shown in FIGURE 21 wherein the pins 14 will cooperate with the shoes 12 in order to interconnect the collar 3 with the sleeve 2 as shown in FIGURE 5. When the control elements have been moved into the position shown in FIGURE 20 then the shoes 14 are withdrawn and the collar 3 can move upon the sleeve 2.

At the other ends of the levers 5 they are cut away as shown so that their ends overlap and it is at this point that the control cam 25 acts to bring about the operation of the transmission.

When the force of the spring 24 is overcome by the cam element 25 as shown in FIGURE 20, the sleeve 2 is freed and it will return to its starting position by the force of the springs 8.

The collar 3 is disconnected and passes to neutral in the following manner.

The collar 3 is disconnnected from the teeth of the gear 4, because when withdrawing the sleeve 2, owing to the difference of speeds, it carries along the collar 3, because the pins 12 are still joined to the sleeve 2 and they are joined owing to the circumstance that the interior teeth of the gear 4 do not let the pin 12 rise unless the collar 3 has passed from the interior teeth of the gear 4. At this moment, then, the pins 12 are free and lodge in the interior groove of the gearing of gear 4, because the pins 14 have previously been lifted by the movement of the cam 25 shown on FIG. 20.

It will be noted that the change speed gear described above is simple and quite powerful. It is therefore possible to couple transmission inverters.

It is also possible to utilize the motor as a brake or upon sharp increases in acceleration because it is necessary to change from one speed to another in a gradually ascending or descending direction but the operator may instantaneously pass say from 2nd gear to 5th gear without any necessity of passing through the intermediate gears.

It may also be noted that double gear boxes are eliminated and that weights, damages, maintenance and repair are reduced while the safety of the driver is increased.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

We claim:

1. A change speed means comprising a driven shaft, said shaft having a flange thereon, inclined cams upon said flange, a gear having exterior teeth for driving a driven element, said gear having two rows of spaced interior teeth, a sleeve longitudinally slidable upon said shaft having teeth for engaging said inclined cams, a collar on said shaft spaced from said flange, means for locking said collar to said shaft, resilient means coacting with said collar and said sleeve urging said sleeve against said inclined cams, a second collar movable upon said sleeve having teeth for engaging said interior teeth of said gear and means for locking said second collar to said sleeve for driving said gear wheel from said shaft.

2. A change speed means as set forth in claim 1 wherein said means for locking said second collar to said sleeve comprises a pair of pivoted levers interconnected by a spring and a cam for operating said levers.

3. A change speed means as set forth in claim 2 wherein said levers cooperate with spring urged pins for connecting said sleeve to said second collar.

4. A change speed means as set forth in claim 1 wherein said means for locking said collar to said shaft comprises a pivot formed by two half rings.

5. A change speed means as set forth in claim 1 wherein a plurality of gears are mounted on said sleeve for taking care of a plurality of speeds.

6. A change speed means as set forth in claim 1 wherein said resilient means are operative to move said sleeve against said inclined cams after said second collar is unlocked from said sleeve.

References Cited

UNITED STATES PATENTS

| | | | |
|---|---|---|---|
| 2,245,017 | 6/1941 | Sinclair | 74—337 |
| 2,515,114 | 7/1950 | Chilton | 74—337 X |
| 3,217,847 | 11/1965 | Petrak | 192—67 X |

BENJAMIN W. WYCHE, III, *Primary Examiner.*